United States Patent [19]

Hausmann

[11] 4,271,037
[45] Jun. 2, 1981

[54] DEVICE FOR THE PRODUCTION OF SOL-GEL GLOBULES IN COARSE AND FINE FRACTIONS

[75] Inventor: Werner A. Hausmann, Staufen, Switzerland

[73] Assignee: Gesellschaft zur Forderung der Forschung an der Eidgenossichen Technischen Hoschschule, Zurich, Switzerland

[21] Appl. No.: 131,819

[22] Filed: Mar. 19, 1980

[51] Int. Cl.³ .............................................. B01J 19/06
[52] U.S. Cl. ............................................... 252/359 R
[58] Field of Search ....... 252/359 R, 359 A, 315–317, 252/301.1 S; 422/131

[56] References Cited

U.S. PATENT DOCUMENTS

| | | | |
|---|---|---|---|
| 2,442,387 | 6/1948 | Valas | 252/359 R X |
| 3,290,122 | 12/1966 | Clinton et al. | 252/301.1 S |
| 3,340,567 | 9/1967 | Flack et al. | 252/301.1 S X |
| 3,586,742 | 6/1971 | Chin et al. | 252/301.1 S X |
| 3,933,679 | 1/1976 | Weitzel et al. | 252/301.1 S |
| 4,209,492 | 6/1980 | Naefe | 252/301.1 S |

*Primary Examiner*—William A. Cuchlinski, Jr.
*Attorney, Agent, or Firm*—Watson, Cole, Grindle & Watson

[57] ABSTRACT

A device for the production of sol-gel globules for sphere-pac nuclear fuel includes a vertical gelling column opening into an elongated vat through its bottom wall, the vat receiving a horizontal gelling stream issuing from a ribbon nozzle. The bottom wall of the vat declines from the gelling column at one end thereof toward an outlet at the opposite end. A sol-liquid feed device is capable of optionally delivering sol-liquid droplets onto a vertical gelling stream produced in the gelling column, while the ribbon nozzle is closed, for the production of a coarse globule fraction, and is capable of delivering fine sol-liquid jets onto the horizontal gelling stream, with the gelling column closed for the production of fine globule fractions. When operating with the vertical gelling stream, the vat serves as an overflow for superfluous gelling liquid, and during operation with the horizontal gelling stream, the gelling column serves as a safety overflow. Because of the combination of vertical and horizontal gelling streams made possible by the collecting vat, the device is of compact design, and requires little space while operating efficiently and safely.

5 Claims, 2 Drawing Figures

DEVICE FOR THE PRODUCTION OF SOL-GEL GLOBULES IN COARSE AND FINE FRACTIONS

BACKGROUND OF THE INVENTION

This invention relates to a device for the production of sol-gel globules, especially green sol-gel globules for sphere-pac nuclear fuel, by which at least one each of coarse and fine globule fractions are produced by the dripping of sol-liquid into a vertical gelling stream for producing the coarse fraction, and by the scattering of at least one jet of the sol-gel liquid in a horizontal gelling stream for producing the fine fractions, in an optional sequence of operations.

Sphere-pac nuclear fuel is defined as a mixture of discrete globule sizes. It is evidence of the quality of fuel elements in general when the fuel is evenly distributed with even density throughout the wrapper tube. This requirement can be satisfied for sphere-pac nuclear fuel if the globules are of possible uniform size within a particular fraction. Generally, two to three globular fractions are needed for sphere-pac nuclear fuel, their diameters having a relationship of 1:7 to 1:10.

For the production of sol-gel globules, small globular droplets of an aqueous metal solution having gelling properties, the so-called mixing feed solution, are gelled within a stream of a hot gelling liquid which does not mix with the mixing feed solution as, for example, silicon fluid, because of an internal chemical reaction, so that they no longer adhere to each other and are carried away by the gelling stream. With this process, aluminum—or iron globules, for example, but in particular also the oxides thereof—and carbide nuclear fuels may be produced.

For nuclear fuels, it is customary to utilize uranium with varying plutonium and/or thorium contents, or thorium alone as the heavy metal. The aqueous solution of nitrates of these metals contains an ammonia donor, for example, hexamethylentetramine, which quickly decays when heated, very rapidly raising the pH value of the solution which leads to the amorphous or microcrystalline precipitation of the heavy-metal hydroxides.

Sol-gel globules with a diameter of more than 1 mm can be produced with satisfactory throughput and a very narrow dimensioning by dripping sol-liquid through one or more hollow needles into a hot gelling stream slowly flowing within a vertical gelling column. The spherical feed droplets gel during their descent within the gelling stream and, given a suitable relationship between the densities of the gelling means and the sol-liquid, the droplets are also sufficiently solidified in their spherical shape. The gelling column may comprise, for example, a double-walled tube open at the top and preferably made of glass, the outer tube having an enlarged upper end to form an overflow container with a discharge spout, and the lower end of the outer tube being connected to the inner tube becomes a discharge. The gelling column is in precisely vertical adjustment, so that the sol-liquid droplets, issuing from the hollow needle or needles entering the gelling stream descending within the vertical gelling column, may descend within such stream without touching the wall of the inner tube, and whereby the solidified sol-gel globules may be transferred outwardly of the gelling column through the discharge opening, together with the gelling liquid. For continuous operation, the discharge is connected with a separating device, containing strainers, where the sol-gel globules are separated from the gelling liquid and the latter is directly returned into the heatable vat of gelling liquid. From this vat, the collected and reheated gelling liquid is cleaned by filters, regenerated and then pumped back into the gelling column. The hollow needles are disposed a sufficient distance above the gelling column, so that a complete separation of the undivided sol-liquid from the hot gelling stream is assured thereby resulting in a trouble-free operation.

Smaller sol-gel globules with diameters less than one-half a millimeter cannot be satisfactorily produced by this dripping method, since even with the use of several hollow needles, the throughput of one gelling column alone would be insufficient. German Offenlegungschrifft No. 24 24 209 (Interfuel 1974) describes a production method for small sol-gel globules with satisfactory throughputs and with sufficiently small deviations in size. The device used with such a system is known as "jet-chopper". One or more thin jets of sol-liquid in their free, laminar state are introduced more or less vertically, into a horizontal, ribbon shaped and free flowing laminar, hot gelling stream, where each of the feed jets disintegrates into regular, globule droplets which are solidified almost immediately in this hot gelling liquid thereby forming corresponding regular globules. The two flows are maintained by the gelling liquid being delivered through a ribbon nozzle, and sol-liquid is delivered through one or more nozzles or hollow needles with openings having diameters of the desired jet cross-section. The horizontal distance of the outlet openings from the outlet opening level of the ribbon nozzle and their elevation above the horizontal gelling stream are chosen as being so small that the junction of the two streams is bound to take place within the area where they are still laminar. After a certain distance, requisite for the solidification of the sol-gel globules, the gelling stream may become turbulent. The gelling stream carrying the fine globules is removed through a channel or duct. For continuous operation, the duct may be connected with a separating device, as in the system utilizing the aforedescribed dripping method, and the separated and regenerated gelling liquid may be returned to the ribbon nozzle.

For optimally producing fractions of sol-gel globules for sphere-pac nuclear fuels, therefore, both of the aforedescribed known processes are used. However, each of these methods requires rather high investments in equipment with a corresponding requirement of space. This entails a disadvantage, inasmuch as the sol-gel globules must be manufactured in glove-boxes which are kept as small as possible for reasons of economy, thereby resulting in a very cramped space. Thus, while these methods permit the satisfactory production of sol-gel globules for sphere-pac nuclear fuel of good quality, the production is very expensive because of the necessary equipment required.

SUMMARY OF THE INVENTION

It is therefore an object of the present invention to provide a compact, efficient and highly effective device for the production of sol-gel globular fractions, particularly for sphere-pac nuclear fuel, which may utilize both the aforedescribed methods in a continuous operation thereby requiring relatively little space, so that it may be housed in small glove-boxes.

The present invention utilizes a known device for the production of sol-gel globules by the dripping method but provides a relatively inexpensive device at the upper end of the vertical gelling column, normally having an overflow container. Such device of the invention is in the form of an elongated horizontal vat so that a ribbon nozzle may be used therewith for the generation of horizontal gelling stream for the production of sol-gel globules by the scattering method. The vat, requiring essentially no more space than the normally provided duct for the horizontal gelling stream, during the production of a coarse fraction of sol-gel globules according to the dripping method, serves as a safety overflow for the gelling liquid and, when producing a fine fraction of sol-gel globules, a safety overflow for the gelling liquid is provided by the vertical gelling column. And, additional equipment such as a separating device, a regenerating device, a pump and feeding device for the sol-liquid for the production of sol-gel globules of coarse and fine fractions, need be provided only once, since these pieces of equipment, if appropriately designed may, without difficulty, be adapted from the operational parameters for the production of sol-gel globules according to one method, to the requirements of the operational parameters for the production of globules with the other method.

Other objects, advantages and novel features of the present invention will become more apparent from the following detailed description of the invention when taken in conjunction with the accompanying drawings.

DETAILED DESCRIPTION OF THE INVENTION

Figure 1:
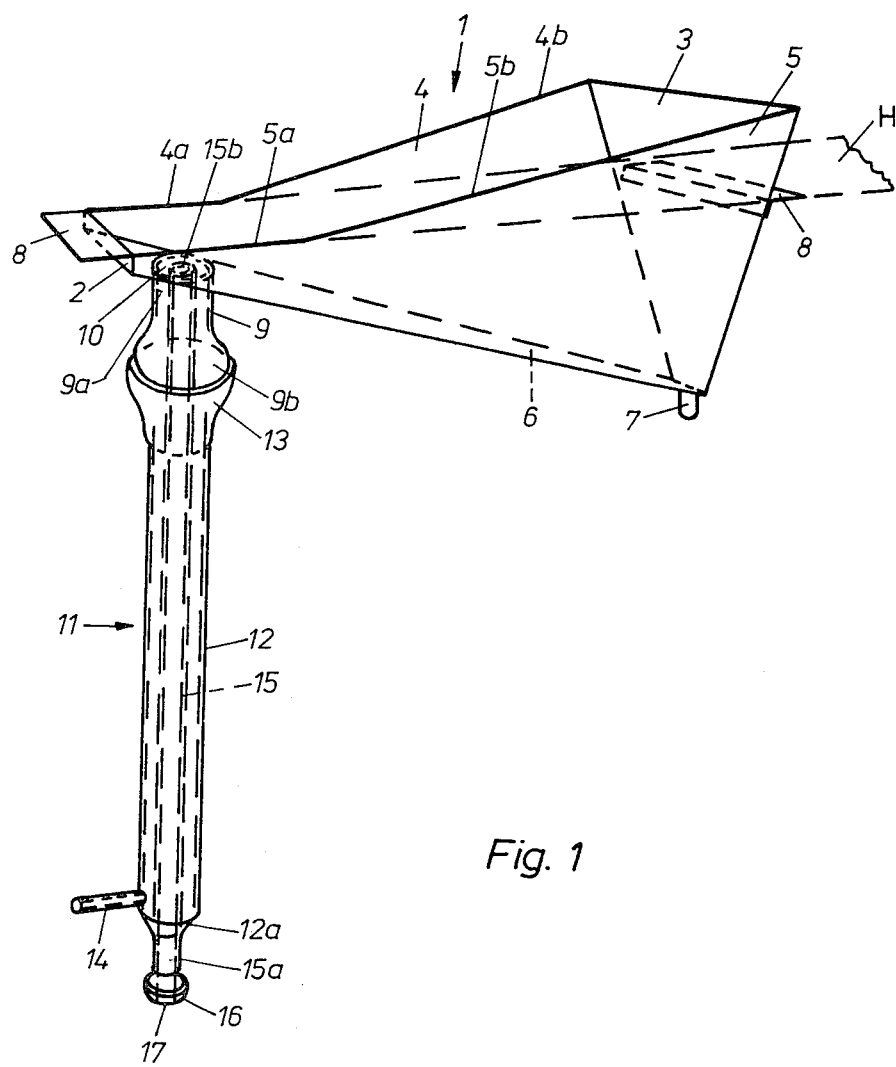
FIG. 1 is a perspective view of a combined elongated vat for the horizontal gelling stream and a vertical gelling column as the principle components of the device according to the invention.

Turning now to the drawings wherein like reference characters refer to like and corresponding parts throughout the several views, an elongated vat 1 is shown in FIG. 1 as horizontally arranged to receive a horizontal gelling stream to be more fully described hereinafter. The vat comprises a rectangular, narrow wall 2 at one end and a trapazoidal, narrow wall 3 at the opposite end. The open width as well as the depth of the vat increases from wall 2 to wall 3. The end walls are interconnected by side walls 4 and 5, and by a bottom wall 6 having a width which decreases from wall 2 to wall 3. A portion of the upper edges of side walls 4 and 5 are horizontal as at 4a and 5a and lie in a horizontal plane H, and the remainder of the side wall upper edges incline upwardly toward end wall 3 as at 4b, 5b. Portions of the side walls therefore extend above horizontal plane H to thereby assure that, when the vat collects the horizontal gelling stream, spattered gelling liquid does not escape the vat. Bottom wall 6 declines relative to the horizontal plane and, at its lowest point, has an outlet spout 7 designed in such a manner that all the liquid will drain from the vat, leaving no residue.

In a preferred embodiment, the vat was made of 1.5 mm steel sheeting, and having a polished interior. The vat was about 40 cm long and had a width of about 9 cm at end wall 2 and about 12 cm at the top of end wall 3. Wall 6 at end wall 2 was located at about 1 cm below horizontal plane H and about 14 cm below this plane at the opposite end. The height above the side walls above horizontal plane H at end wall 3 was about 6 cm. In the area of outlet spout 11, bottom wall 6 was about 2.5 cm wide. Such vat was found to be entirely safe and durable during actual operation.

In the area of the inlet to the vat, i.e., in the vicinity of end wall 2, a spherical coupling 9 is attached in such a manner that its longitudinal axis lies at right angles to horizontal plane H. The spherical coupling has a continuous longitudinal bore 9a with a diameter of about 4 cm and flares outwardly as a spherical element 9b. Coupling 9 is attached to bottom wall 6 and communicates with the interior of the vat through an opening 10 provided in the bottom wall. Also, the spherical coupling is preferably of polished steel.

Figure 2:
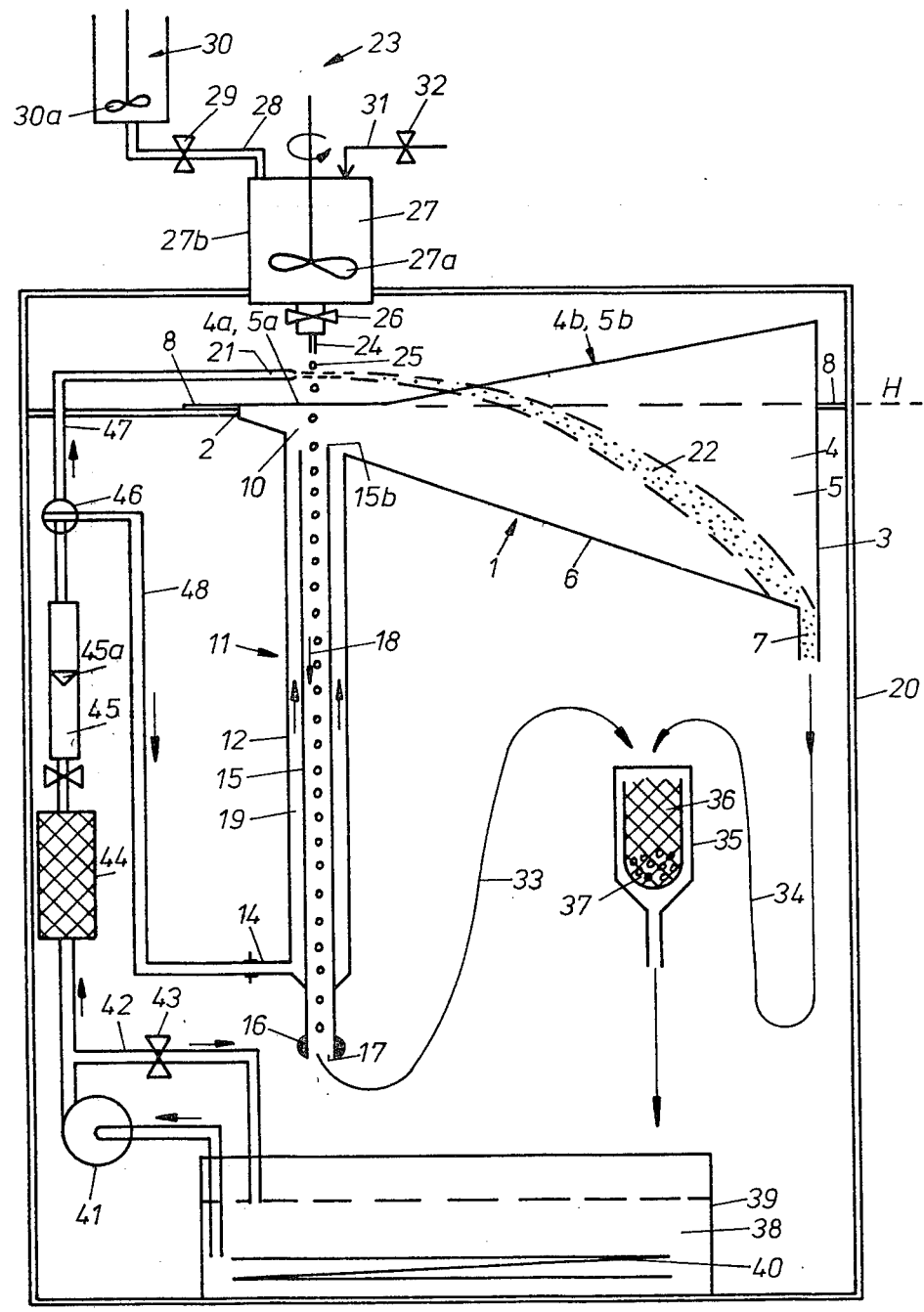
FIG. 2 is a diagrammatical view of the device for the production of coarse and fine sol-gel globules according to the invention, whereby the vat and gelling column of FIG. 1 are combined with a ribbon nozzle and a feeding device for the sol-liquid.

A vertical gelling column, generally designated 11, is connected to the spherical coupling. The vertical gelling column comprises a double-walled glass tube in which outer tube 12 at its upper end is enlarged and widened to form a spherical coupling socket 13 which engages element 9b in the manner of a ball-and-socket joint. Lower end 12a of the outer tube is fused to an inner tube 15 of the column, the inner tube extending at opposite ends from the outer tube. Lower end 15a of the inner tube is in the form of an outlet 17 having a spherical coupling 16 to facilitate attachment to a pipeline 33 (FIG. 2). In the mounted position of gelling column 11, upper end 15b of the inner tube rests within opening 10 and at its lower end, outer tube 12 has a lateral tubular spout 14 provided for the feeding and likewise for the removal of the gelling liquid. In the preferred embodiment, inner tube 15 had a length of about 41 cm and an inner diameter of about 1.7 cm, while the inner diameter of the outer tube was about 3.6 cm.

Brackets 8 or the like may be secured to both end walls of the vat for fixedly or adjustably mounting the vat in place on a structural support 20.

FIG. 2 is a schematic diagram of the remainder of the device according to the invention with the vat and the gelling column shown mounted within the support structure such that the gelling column is in an exactly vertical position. By feeding a gelling liquid through tubular spout 14, a slowly, downwardly flowing vertical gelling stream is created in the direction of arrow 18. The hot gelling liquid issuing from spout 14 flows through an annular space 19 defined between the spaced, coaxial inner and outer tubes, upwardly and through the open upper end 15b and into the interior of tube 15. Any superfluous gelling liquid is received by the vat and is removed through its outlet 7.

Also attached to support structure 20 is a ribbon nozzle 21 provided for the formation of a hot horizontal gelling stream 22. A sol-liquid feeding device, generally designated 23, is also mounted on the support. Ribbon nozzle 21 is designed and adjusted in such manner that it produces a flat, at first laminar, essentially parallel gelling stream 22, which does not touch the side walls of the vat, and is parallel to horizontal plane H, and which is subsequently received by the vat in its entirety and is removed through outlet 7. It can be therefore seen that the vertical gelling column forms a safety overflow for the gelling liquid which will run off through inner tube 15.

Feeding device 23 for the sol-liquid is designed to optionally deliver sol-liquid droplets and fine sol-liquid jets through nozzles 24 which include hollow needles for the formation of sol-liquid droplets 25, and which include fine jet-nozzles or jet-hollow needles arranged in one or several rows at right angles to stream 22 for the formation of sol-liquid jets. The drip-hollow needles are so adjusted in relation to inner tube 15 that the issuing sol-liquid droplets 25 fall into the inner tube without touching its interior wall. Also, the ball-and-socket joint 9b, 13 permits the inner tube to be vertically adjusted so as to lie precisely along a plumb line from nozzles 24 to thereby further assure that droplets 25 will fall without touching the inner surface of tube 15. The outlet tips of the drip-hollow needles and of the nozzles or jet-hollow needles are located high enough above the horizontal plane H so that horizontal gelling stream 22 is not influenced by them, and free-flowing laminar sol-liquid jets may be fed into the horizontal gelling stream by the jet-nozzles or the jet-hollow needles. The feeding device also includes a combination of conventional dripping device used with the dripping system, and a jet device commonly used with the scattering system. Preferably, however, the means for adjusting the operational parameters for the sol-liquid, especially its temperature and pressure, are provided by a single means, and sol-liquid feeding device 23 is designed in such manner that a simple pre-adjustment, as needed, suffices for the drip-hollow needles or the jet nozzles or hollow needles, respectively, to be supplied with the appropriate temperature and pressure.

Of the conventional attachments connected as shown in FIG. 2, one of such attachments is the aforementioned feeding device 23 for sol-liquid, such device comprising a sol-liquid storage container 27 having an agitator 27a and a cooling jacket 27b to which nozzles 24 are connected through suitable valving 26. Device 23 also includes a sol-liquid regeneration container 30 having an agitator 30a, the container being connected to sol-liquid storage container 27 by a sol-liquid feed pipe 28 containing a valve 29. Also connected to container 27 is a pressure pipe 31, preferably designed for use with compressed air and containing a valve 32 for regulation of the pressure.

Mounted within support structure 20 is also a separating device 35 containing strainer inserts 36 for the separation of the sol-gel globules 37 as produced from the gelling liquid. The separating device, for example, may be a ribbon filter for the continuous removal of the sol-gel globules from the gelling liquid. The gelling liquid is returned from the separating device into a heatable vat 39, where the collected gelling liquid 38 is reheated to the required temperature by a heating device 40. The gelling stream is produced by a pump 41 which suctions the gelling liquid out of vat 39, part of the suctioned gelling liquid being returned to the vat 39 by way of a by-pass 42 containing a choke valve 43. The remaining portion of the suctioned gelling liquid passes through a filter 44 to be regenerated, and through a rotameter 45, containing a valve 45a for the regulation of the gelling stream, and thereafter into either line 47 or 48 via a three-way valve 46, for selectively feeding the gelling liquid to ribbon nozzle 21 or to vertical gelling column 11.

In operation, coarse sol-gel globules are produced by adjusting three-way valve 46 so as to direct the gelling liquid through line 48 into the vertical gelling column, ribbon nozzle 21 thereby being turned off. In vertical gelling column 11, the gelling stream rises through annular space 19 and flows downwardly inside inner tube 15 thereby functioning as a heat transfer and transport medium for the sol-gel globules dropped into the descending gelling stream. Any superfluous gelling liquid is received by vat 1 and is discharged through spout 7 to separating device 35 and back into vat 39. The sol-liquid is dripped from container 27 in the shape of droplets 25 through the hollow needles of nozzles 24, by opening feed cock 26 while valve 29 in feeder line 28 remains closed and the necessary pressure to the sol-liquid is applied through pressure regulating valve 32. The vertical gelling stream carrying the coarse sol-gel globules reaches separating device 35 through a line 33, where the sol-gel globules 37 are separated from the gelling liquid.

For the production of fine sol-gel globule fractions, the three-way valve 46 is re-adjusted in such manner that the gelling stream flows through line 47 and into ribbon nozzle 21, line 48 leading to the vertical column being blocked. The ribbon nozzle produces a horizontal gelling stream 22 and the jet nozzle of nozzles 24, which are made to communicate with the sol-liquid in container 27, forms a sol-jet scattering of uniform globules onto the horizontal gelling stream. This gelling stream carrying the fine sol-gel globules is received by vat 1 and through its outlet spout 7 and discharge line 34 is delivered into separating device 35. If, for any reason, the level of the liquid in the receiving vat should elevate, inner tube 15 of the vertical column serves as a safety overflow and takes the gelling liquid through line 33 into the separating device 35. Usually, the level of the liquid in vat 1 is at about the elevation of outlet 7. Regulation of the liquid level for both modes of operation, dripping in the vertical column or scattering onto the horizontal gelling stream, is achieved by a corresponding higher positioning of separating device 35, or lines 33 and 34 designed as siphons, respectively.

In order to be able to choose either coarse or fine fractions of sol-gel globules, only certain adjustment means must be activated, which in the foregoing have been described as valves, but which may be of alternate suitable designs so long as they perform the optimum service. The aforedescribed attachments have been referred to in general terms since they are not critical to the invention and are known as such in the technology of sol-gel processes.

Many modifications and variations of the invention are made possible in the light of the above teachings, without affecting the scope of the invention, in order to permit optimum adaptation to the individually given conditions. For example, the collecting vat may be made as an extruded hollow body without sharp edges and corners which might be expensive if manufactured in low numbers but would assure that no residue of the gelling liquid can remain. For increasing the throughput, the single double-walled vertical gelling column of large diameter may be substituted by two or more double-walled columns of smaller diameters suitably connected to the attachments. In the sol-feeding device, exchangeable nozzle and hollow needle sets with corresponding different jets, and hollow needle diameters, respectively, may be provided, whereby such nozzle and needle-sets may be combined to, for example, an adjustable aggregate, operable by means of an activating device, so that different fractions of coarse and fine sol-gel globules with different globule diameters can be obtained. In such manner, the device according to the invention is quite adaptable to the given requirements, and in each case assures compactness and safety of operation.

What is claimed is:

1. A device for the production of sol-gel globules, especially green sol-gel globules for sphere-pac nuclear fuel, in at least one each coarse and fine globule fraction, by dripping a sol-liquid into a vertical gelling stream for the coarse fraction and scattering of at least one sol-liquid jet in a horizontal gelling stream for the fine fraction in optional subsequent processes, the device comprising a support, a ribbon nozzle mounted on said support for the formation of a horizontal gelling stream, a vat horizontally mounted on said structure for the reception of said gelling stream, said vat having a narrow first end wall and a narrow second end wall interconnected by spaced side walls and a bottom wall declining from said first to said second end walls, said first end wall lying in the vicinity of said ribbon nozzle and said bottom wall having an outlet adjacent said second end wall, a vertical gelling column depending from said bottom wall in open communication with said vat and lying near said nozzle, a tubular spout on said column for feeding gelling liquid into said column and downwardly therethrough as a vertical gelling stream, means connected to said ribbon nozzle and to said spout for optionally feeding gelling liquid thereto from a gelling liquid supply, said column having a bottom outlet for the removal of the vertical gelling stream, a sol-liquid feed device mounted on said structure above said column and above said ribbon nozzle, said feed device including nozzle means for optionally delivering sol-liquid droplets from a sol-liquid supply onto the vertical gelling stream when the gelling liquid is fed through said spout for thereby forming coarse sol-gel globules, and for delivering jets of fine sol-liquid from the sol-liquid supply to the horizontal gelling stream when the gelling liquid is fed through said ribbon nozzle for thereby forming fine sol-gel globules.

2. The device according to claim 1, wherein said vertical gelling column comprises coaxial spaced inner and outer tubes, said inner tube being open at opposite ends, said spout being connected to said outer tube between opposite ends thereof, said outer tube being attached at its lower end to said inner tube and at its upper end to said bottom wall of said vat, the upper open end of said inner tube terminating at said bottom wall so that, during formation of the coarse sol-gel globules, the gelling liquid fed by said spout into said outer tube rises upwardly within the space between said tubes and enters said inner tube through said upper open end thereof with any superfluous gelling liquid being received by said vat, and, during formation of the fine sol-gel globules, any superfluous gelling liquid fed from said ribbon nozzle into said vat is received by said column.

3. The device according to claim 2, wherein said outer tube is attached to said bottom wall by means of a spherical coupling permitting said inner tube to be vertically adjusted so that the sol-liquid droplets may be delivered into the center of the descending gelling stream within said inner tube.

4. The device according to claim 1, wherein said side walls terminate in first upper edges in the vicinity of said feed device and lie in a horizontal plane, said side walls terminating in upper edges in the vicinity of said outlet lying above said plane to avoid any splattering of said horizontal stream outwardly of said vat.

5. The device according to claim 4, wherein said vat is formed of sheet metal, and the interior surface of said vat is polished.

* * * * *